(12) United States Patent
Nakashima et al.

(10) Patent No.: US 10,767,068 B2
(45) Date of Patent: Sep. 8, 2020

(54) PHOTOCURABLE INKJET PRINTING INK COMPOSITION

(71) Applicant: SAKATA INX CORPORATION, Osaka-shi, Osaka (JP)

(72) Inventors: Okinori Nakashima, Osaka (JP); Takuya Myose, Osaka (JP); Takuya Okamoto, Osaka (JP); Kazuhiro Fuke, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 16/079,043

(22) PCT Filed: Jan. 31, 2017

(86) PCT No.: PCT/JP2017/003457
§ 371 (c)(1),
(2) Date: Aug. 22, 2018

(87) PCT Pub. No.: WO2017/145671
PCT Pub. Date: Aug. 31, 2017

(65) Prior Publication Data
US 2019/0062580 A1 Feb. 28, 2019

(30) Foreign Application Priority Data
Feb. 23, 2016 (JP) ................. 2016-032395

(51) Int. Cl.
| | |
|---|---|
| *C08F 2/46* | (2006.01) |
| *C08F 2/50* | (2006.01) |
| *C08G 61/04* | (2006.01) |
| *C09D 11/38* | (2014.01) |
| *C09D 11/30* | (2014.01) |
| *C09D 11/037* | (2014.01) |
| *C09D 11/101* | (2014.01) |
| *C09D 11/106* | (2014.01) |
| *C09D 11/107* | (2014.01) |
| *C09D 11/32* | (2014.01) |

(52) U.S. Cl.
CPC ............ *C09D 11/38* (2013.01); *C09D 11/037* (2013.01); *C09D 11/101* (2013.01); *C09D 11/106* (2013.01); *C09D 11/107* (2013.01); *C09D 11/30* (2013.01); *C09D 11/32* (2013.01)

(58) Field of Classification Search
CPC ....... C09D 11/38; C09D 11/32; C09D 11/106; C09D 11/037; C09D 11/107; C09D 11/101
USPC ............. 522/26, 7, 6, 71, 1, 189, 184; 520/1
See application file for complete search history.

(56) References Cited

U.S. PATENT DOCUMENTS

| | | | |
|---|---|---|---|
| 2009/0171007 A1 | 7/2009 | Jonai et al. | |
| 2015/0210874 A1 | 7/2015 | Mizutani et al. | |
| 2019/0031895 A1* | 1/2019 | Sato | B41J 2/01 |
| 2019/0085188 A1* | 3/2019 | Hall | C09D 4/00 |

FOREIGN PATENT DOCUMENTS

| | | | |
|---|---|---|---|
| EP | 2692805 A1 | 2/2014 | |
| EP | 3412738 A1 | 12/2018 | |
| JP | 2008156443 A | 7/2008 | |
| JP | 2010070754 | * | 4/2010 |
| JP | 2010070754 A | 4/2010 | |
| JP | 2015168723 A | 9/2015 | |
| JP | 2016199688 A | 12/2016 | |
| WO | 2007013368 A1 | 2/2007 | |
| WO | 2013027672 A1 | 2/2013 | |
| WO | 2015184166 A1 | 12/2015 | |

OTHER PUBLICATIONS

Kito et al, JP 2010-070754 Machine Translation, Apr. 2, 2010 (Year: 2010).*
Notification Concerning Transmittal of International Preliminary Report on Patentability (PCT/IB326) and Translation of the International Preliminary Report on Patentability (PCT/IB/338) dated Sep. 7, 2018, with International Preliminary Report on Patentability (PCT/IB/373) and Written Opinion of the International Searching Authority (PCT/ISA/237), for corresponding international application PCT/JP2017/003457.
International Search Report (ISR) dated Mar. 21, 2017, issued for International application No. PCT/JP2017/003457.
Extended European Search Report (EESR) dated Sep. 16, 2019, issued for European counterpart patent application No. EP17756113.1 (6 pages).

* cited by examiner

*Primary Examiner* — Jessica Whiteley
(74) *Attorney, Agent, or Firm* — Law Office of Katsuhiro Arai

(57) ABSTRACT

A photocurable inkjet printing ink composition contains a photopolymerizable compound and a photopolymerization initiator, wherein in 100 percent by mass of the photocurable inkjet printing ink composition, included are: an acrylamide-based monomer by 5.0 to 50 percent by mass; a monofunctional monomer other than acrylamide-based monomer by 15 to 70 percent by mass; a polymerizable compound having two or more functionalities by 5.0 to 30.0 percent by mass; vinyl caprolactam by 0.1 to 15 percent by mass and/or an acrylated amine compound having two photopolymerizable functional groups and two amino groups in the molecule by 0 to 10 percent by mass; and the percentage of monofunctional monomers in the photopolymerizable compound is 60 to 99.5 percent by mass.

14 Claims, No Drawings

PHOTOCURABLE INKJET PRINTING INK COMPOSITION

This application is the U.S. National Phase under 35 U.S.C. § 371 of International Application PCT/JP2017/003457, filed Jan. 31, 2017, which claims priority to Japanese Patent Application No. 2016-032395, filed Feb. 23, 2016. The International Application was published under PCT Article 21(2) in a language other than English.

TECHNICAL FIELD

The present invention relates to a photocurable inkjet printing ink composition offering excellent storage stability, which also exhibits good printability characteristics such as anti-bleeding property as well as wide color gamut even when printed on absorbent media such as ordinary paper or low-absorbent media such as coated offset printing paper.

BACKGROUND ART

Photocurable inks are quick to dry, contain no volatile solvents that may volatilize and have harmful effects on the environment, and can also be printed on various base materials, and for these excellent performance characteristics, they are used in wide-ranging fields such as offset printing, gravure printing, screen printing, letterpress printing, and various other coating and inkjet printing applications.

In particular, inkjet printing provides an easy, inexpensive way to create images on base materials of any material or shape, and thus is applied in a variety of fields from traditional printing of logos, graphics, photo images, etc., to marking, color filtering, and other special printing applications; when combined with the performance of photocurable inks, therefore, inkjet printing is expected to produce better printed matter.

Furthermore, there is a call, of late, for various base materials that are stretched or bent after printing, to be printable by the inkjet method.

Also, in recent years, light-emitting diodes (LEDs) are replacing mercury lamps and metal halide lamps as light sources used for photocurable inkjet printing ink compositions from the viewpoint of protecting the environment, and accordingly there is a call, from the viewpoint of production efficiency, for photocurable inkjet printing ink compositions that can be cured fully even with low LED irradiation energy (such as 100 mJ/cm² or less in total light quantity).

To solve these problems, an active energy ray-curable ink is proposed that combines a monofunctional monomer and a polyfunctional monomer, wherein the monofunctional monomer contained therein is a (meth)acrylate having phenoxy groups, an ethylene oxide adduct, or a propylene oxide adduct thereof, etc. (refer to Patent Literature 1, for example). Certainly an active energy ray-curable ink having the aforementioned monomer composition offers good stretchability, but its curability, tackiness, post-processability and abrasion resistance are not sufficient.

In addition, a photocurable inkjet printing ink composition is proposed that comprises a photopolymerizable compound in which monofunctional monomers are contained by 85.0 to 99.9 percent by mass and a urethane oligomer having ethylene unsaturated double bonds is contained by 0.1 to 15 percent by mass, wherein the monofunctional monomers contain acryloyl morpholine and the content of acryloyl morpholine is 30 percent by mass or more relative to the total mass of the photopolymerizable compound, and wherein the monofunctional monomers include a monofunctional monomer having a heterocyclic ring and a monofunctional monomer having an alicyclic structure and the total content thereof is 50 percent by mass or more relative to the total mass of the aforementioned photopolymerizable compound (refer to Patent Literature 2, for example). Responding to the recent call for higher performance, the aforementioned ink composition offers good curability, tackiness, and adhesion, but it presents a problem in terms of bending tolerance.

BACKGROUND ART LITERATURE

Patent Literature

Patent Literature 1: WO 2007/013368
Patent Literature 2: WO 2013/027672

SUMMARY OF THE INVENTION

Problems to be Solved by the Invention

Accordingly, an object of the present invention is to provide a photocurable inkjet printing ink composition offering excellent discharge stability, which also exhibits excellent curability, adhesion, and abrasion resistance, and of which coating film has little tackiness, exhibits excellent stretchability, and does not crack in post-processing, even when the total light quantity of irradiation energy of ultraviolet light (especially ultraviolet light from an LED light source) is low (when the total light quantity is 100 mJ/cm² or less, for example).

Means for Solving the Problems

After studying in earnest to achieve the aforementioned object, the inventors of the present invention invented a photocurable inkjet printing ink composition that satisfies the following:

1. A photocurable inkjet printing ink composition containing a photopolymerizable compound and a photopolymerization initiator, wherein the photocurable inkjet printing ink composition is characterized in that 100 percent by mass of the photocurable inkjet printing ink composition comprises:
   a. an acrylamide-based monomer by 5 to 50 percent by mass;
   b. a monofunctional monomer other than acrylamide-based monomer by 15 to 70 percent by mass;
   c. a polymerizable compound having two or more functionalities by 5.0 to 30.0 percent by mass;
   d. vinyl caprolactam by 0.1 to 15 percent by mass and/or an acrylated amine compound having two photopolymerizable functional groups and two amino groups in the molecule by 0 to 10 percent by mass; and
   e. the percentage of monofunctional monomers in the photopolymerizable compound is 60 to 99.5 percent by mass.

2. The photocurable inkjet printing ink composition according to 1, wherein the acrylamide-based monomer is an acrylamide-based monomer expressed by General Formula (I) below:

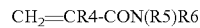

(In the formula, R4 represents a hydrogen atom or a methyl group. R5 and R6 may be the same or different, and although they are each a hydrogen atom or a substituted or an unsubstituted alkyl group with the carbon number from 1 to 8, both cannot be a hydrogen atom. Alternatively, R5 and R6 may be bonded to form a ring together with the adjacent nitrogen atom.)

3. The photocurable inkjet printing ink composition according to 1 or 2, wherein the acrylamide-based monomer is acryloyl morpholine.

4. The photocurable inkjet printing ink composition according to any one of 1 to 3, wherein the photopolymerization initiator contains an acylphosphine oxide photopolymerization initiator and the acylphosphine oxide photopolymerization initiator accounts for 2 to 15 percent by mass relative to 100 percent by mass of the photopolymerizable compound.

5. The photocurable inkjet printing ink composition according to any one of 1 to 4, wherein the photopolymerization initiator contains a thioxanthone photopolymerization initiator and the thioxanthone photopolymerization initiator accounts for 5 percent by mass or less relative to 100 percent by mass of the photopolymerizable compound.

6. The photocurable inkjet printing ink composition according to any one of 1 to 5, which contains a coloring agent.

7. The photocurable inkjet printing ink composition according to any one of 1 to 6, of which viscosity at 25° C. is 5.0 to 30 mPa·s.

Effects of the Invention

Also, the photocurable inkjet printing ink composition proposed by the present invention can form a cured film that has little tackiness and does not crack in post-processing, even when the total light quantity of ultraviolet irradiation energy (especially ultraviolet light from an LED light source) is low (when the total light quantity is 120 mJ/cm$^2$ or less, for example).

In addition, the cured film formed by the photocurable inkjet printing ink composition proposed by the present invention exhibits sufficient adhesion, curability, and abrasion resistance even when the total light quantity of ultraviolet irradiation energy is low.

Furthermore, implementing an inkjet printing method using the photocurable inkjet printing ink composition proposed by the present invention is useful because a cured film can be formed even when the total light quantity of ultraviolet irradiation energy is low, which leads to high production efficiency.

MODE FOR CARRYING OUT THE INVENTION

After studying in earnest to achieve the aforementioned object, the inventors of the present invention found that the aforementioned object could be achieved by a photocurable inkjet printing ink composition that contains specific quantities of an acrylamide-based monomer, a different monofunctional monomer, a polymerizable compound having two or more functionalities, vinyl caprolactam, and/or an acrylated amine compound having two amino groups in the molecule, wherein the monofunctional monomers are contained in the photopolymerizable compound by a specific percentage, and consequently completed the present invention.

The photocurable inkjet printing ink composition proposed by the present invention is explained below.

(a. Acrylamide-Based Monomer)

For the acrylamide-based monomer used in the photocurable inkjet printing ink composition proposed by the present invention, an acrylamide-based monomer expressed by General Formula (I) below may be used:

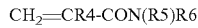

$CH_2=CR4-CON(R5)R6$ (In the formula, R4 represents a hydrogen atom or a methyl group. R5 and R6 may be the same or different, and although they are each a hydrogen atom or a substituted or an unsubstituted alkyl group with the carbon number from 1 to 8, both cannot be a hydrogen atom. Alternatively, R5 and R6 may be bonded to form a ring together with the adjacent nitrogen atom.) Specific examples of acrylamide-based monomers expressed by General Formula (I) include acryloyl morpholine and N-(meth)acryloyl amine, for example. Among these, preferably acryloyl morpholine is used from the viewpoint of safety, etc.

Under the present invention, the content of the acrylamide-based monomer is 5.0 to 70 percent by mass, or preferably 10.0 to 20.0 percent by mass, in the total mass of the photopolymerizable compound. If the content of the acrylamide-based monomer in the photopolymerizable compound is less than 5.0 percent by mass, curability tends to drop, or tackiness tends to worsen. If the content exceeds 70 percent by mass, on the other hand, bending tolerance tends to drop.

(b. Monofunctional Monomer Other than Acrylamide-Based Monomer)

The monofunctional monomer other than acrylamide monomer used in the photocurable inkjet printing ink composition proposed by the present invention may be, for example, cyclohexyl acrylate, tetrahydrofurfuryl acrylate, 4-t-butyl cyclohexyl acrylate, caprolactone modified tetrahydrofurfuryl acrylate, methoxy acrylate, ethoxy acrylate, t-butyl acrylate, isobutyl acrylate, 2-ethyl hexyl acrylate, isooctyl acrylate, isostearyl acrylate, stearyl acrylate, isoamyl acrylate, trimethylol propane formal monoacrylate, trifluoroethyl acrylate, dipropylene glycol diacrylate, hydroxy phenoxy ethyl acrylate, hydroxy phenoxy propyl acrylate, 2-hydroxy ethyl acrylate, 2-hydroxy propyl acrylate, 4-hydroxy butyl acrylate, β-carboxyl ethyl acrylate, benzyl acrylate, methyl phenoxy ethyl acrylate, 2-phenoxy ethyl acrylate (or ethylene oxide and/or propylene oxide added monomer thereof), phenoxy diethylene glycol acrylate, 1,4-cyclohexane dimethanol monoacrylate, 2-methoxy ethyl acrylate, methoxy triethylene glycol acrylate, 2-ethoxy ethyl acrylate, 3-methoxy butyl acrylate, ethoxyethoxy ethyl acrylate, butoxy ethyl acrylate, methoxy dipropylene glycol acrylate, dipropylene glycol acrylate, ethoxylated succinic acid acrylate, ω carboxy polycaprolactone monoacrylate, N-vinyl caprolactam, N-vinyl pyrrolidone, isobornyl acrylate, etc. Any one type of monofunctional monomer selected from the above may be used, or two or more types may be combined, as necessary.

Under the present invention, the content of the monofunctional monomer other than acrylamide-based monomer is 15 to 70 percent by mass, or preferably 25.0 to 60.0 percent by mass, in the total mass of the photopolymerizable compound. If the content of the monofunctional monomer other than acrylamide-based monomer in the photopolymerizable compound is less than 15% percent by mass, discharge stability, adhesion of cured film, and bending tolerance of cured film tend to drop. If the content exceeds 70 percent by mass, on the other hand, curability drops along with tackiness and abrasion resistance of cured film.

It should be noted that, from the viewpoint of improving the curing rate, preferably vinyl caprolactam is used by 15 percent by mass in the total mass of the photopolymerizable compound (if the below-mentioned acrylated amine compound having two photopolymerizable functional groups and two amino groups in the molecule (acrylated amine synergist) is not used, then preferably vinyl caprolactam is used by 0.1 to 15 percent by mass in the total mass of the photopolymerizable compound).

Also, the monofunctional monomers under the present invention are used so that the percentage of the monofunctional monomers in the photopolymerizable compound falls in a range of 60 to 99.5 percent by mass. If the percentage of the monofunctional monomers in the photopolymerizable compound is less than 60 percent by mass, post-curability tends to drop. If the percentage exceeds 99.9 percent by mass, on the other hand, tackiness and curability tend to drop.

(c. Photopolymerizable Compound Having Two or More Functionalities)

The photopolymerizable compound having two or more functionalities used in the photocurable inkjet printing ink composition proposed by the present invention is not the acrylamide-based monomer and may be, for example, vinyloxy ethoxy ethyl (meth)acrylate, diethylene glycol di(meth)acrylate, triethylene glycol di(meth)acrylate, polyethylene glycol di(meth)acrylate, ethoxylated 1,6-hexane diol di(meth)acrylate, ethoxylated neopentyl glycol di(meth)acrylate, propoxylated neopentyl glycol di(meth)acrylate, tripropylene glycol di(meth)acrylate, polypropylene glycol di(meth)acrylate, tetraethylene glycol di(meth)acrylate, ethoxylated trimethylol propane tri(meth)acrylate, propoxylated trimethylol propane tri(meth)acrylate, ethylene oxide modified pentaerythritol tetra(meth)acrylate, ethoxylated pentaerythritol tetra(meth)acrylate, or any monomer not containing ether groups of which specific examples include ethylene glycol di(meth)acrylate, 1,6-hexane diol di(meth)acrylate, neopentyl glycol di(meth)acrylate, 1,4-butane diol di(meth)acrylate, 1,9-nonane diol di(meth)acrylate, or other acrylated amine compound having two photopolymerizable functional groups and two amino groups in the molecule, and the like. Any one type of photopolymerizable compound having two or more functionalities selected from the above may be used, or two or more types may be combined, as necessary.

Under the present invention, the content of the aforementioned photopolymerizable compound having two or more functionalities is 5.0 to 30.0 percent by mass, or preferably 5.0 to 20.0 percent by mass, relative to the total mass of the photopolymerizable compound. If the content of the aforementioned photopolymerizable compound having two or more functionalities is less than 5.0 percent by mass, abrasion resistance of cured film tends to drop. If the content exceeds 30 percent by mass, on the other hand, adhesion to a base material and bending tolerance tend to drop.

(d. Acrylated Amine Compound Having Two Photopolymerizable Functional Groups and Two Amino Groups)

For the photocurable inkjet printing ink composition proposed by the present invention, from the viewpoint of improving the curing rate, an acrylated amine compound having two photopolymerizable functional groups and two amino groups in the molecule (acrylated amine synergist) is used. Use of such acrylated amine compound improves the curability and also achieves high adhesion to polyvinyl chloride sheets. The aforementioned photopolymerizable functional groups are functional groups that undergo polymerization reaction due to visible light or invisible light including ultraviolet light, electron beam, or other ionizing radiation to form crosslinking bonds between the molecules, where examples include both the narrowly-defined photopolymerizable functional groups that are directly activated by irradiation of light to undergo photopolymerization reaction, and the broadly-defined photopolymerizable functional groups of which polymerization reaction, which occurs when light is irradiated onto the photopolymerizable functional groups in the presence of a photopolymerization initiator, is initiated and promoted by the action of the active species generated from the photopolymerization initiator.

The photopolymerizable functional groups include, for example, photopolymerizable functional groups having ethylenic double bonds or other photoradical polymerization reactivity, photopolymerizable functional groups having epoxy groups or other cyclic ether groups or otherwise having photocationic polymerization or photoanionic polymerization reactivity, or the like. Among the aforementioned functional groups, those having (meth)acryloyl groups, vinyl groups, allyl groups or other ethylenic double bonds are preferred, and those having (meth)acryloyl groups are more preferred. As for the photopolymerizable compounds, preferably both of the two photopolymerizable functional groups are (meth)acryloyl groups and have an amine value of 130 to 142 KOHmg/g. It should be noted that, in the Specification of the present application for patent, the amine value represents an amine value per 1 gram of solid content, using 0.1N hydrochloric acid aqueous solution, measured according to the potentiometric titration method (using, for example, a COMTITE system (AUTO TITRATOR COM-900, BURET B-900, TITSTATION K-900) manufactured by Hiranuma Sangyo) and converted to an equivalent of potassium hydroxide.

In terms of the effects of the present invention, preferably the photopolymerizable compound is an acrylated amine compound obtained by reacting together a bifunctional (meth)acrylate and an amine compound. The bifunctional (meth)acrylate may be, for example, 1-4-butadiol di(meth)acrylate, 1,6-hexane diol di(meth)acrylate, 1,9-nonane diol di(meth)acrylate, propylene glycol di(meth)acrylate, 1,3-butylene glycol di(meth)acrylate, neopentyl glycol di(meth)acrylate or other alkylene glycol di(meth)acrylate, di(meth)acrylate of ethylene oxide adduct of bisphenol A, di(meth)acrylate of ethylene oxide adduct of bisphenol F, di(meth)acrylate of ethylene oxide adduct of bisphenol S, di(meth)acrylate of ethylene oxide adduct of thiobisphenol, di(meth)acrylate of ethylene oxide adduct of brominated bisphenol A or other di(meth)acrylate of alkylene oxide adduct of bisphenol, polyethylene glycol di(meth)acrylate, polypropylene glycol di(meth)acrylate or other polyalkylene glycol di(meth)acrylate, di(meth)acrylate of hydroxypivalic acid neopentyl glycol ester, or the like. Among the above, 1,6-hexane diol di(meth)acrylate is preferred. The amine compound may be, for example, benzyl amine, phenethyl amine, ethyl amine, n-propyl amine, isopropyl amine, n-butyl amine, isobutyl amine, n-pentyl amine, isopentyl amine, n-hexyl amine, cyclohexyl amine, n-heptyl amine, n-octyl amine, 2-ethyl hexyl amine, n-nonyl amine, n-decyl amine, n-dodecyl amine, n-tetradecyl amine, n-hexadecyl amine, n-octadecyl amine or other monofunctional amine compound, diethylene triamine, triethylene tetramine, tetraethylene pentamine, 1,6-hexamethylene diamine, 1,8-octamethylene diamine, 1,12-dodecamethylene diamine, o-phenylene diamine, p-phenylene diamine, m-phenylene diamine, o-xylylene diamine, p-xylylene diamine, m-xylylene diamine, menthane diamine, bis(4-amino-3-methyl) cyclohexyl methane, isophorone diamine, 1,3-diamino cyclohexane, spiroacetal diamine, or other polyfunctional amine compound. It may also be polyethylene imine, polyvinyl amine, polyallyl amine or other high-molecular-weight polyfunctional amine compound.

For the acrylated amine compound, preferably a compound obtained by reacting together 1,6-hexane diol di(meth)acrylate and an amine compound, is used. Specific examples include CN371 (manufactured by Sartomer) and EB7100 (EBECRYL 7100, manufactured by Saitek), and the like. Under the present invention, the content of the aforementioned acrylated amine compound having two photopolymerizable functional groups and two amino groups in the molecule is 0 to 10 percent by mass relative to the total mass of the photopolymerizable compound (acrylated amine compound need not be used if vinyl caprolactam is used). If the content of the photopolymerizable compound having two or more functionalities exceeds 10 percent by mass, viscosity tends to increase.

(Coloring Agent)

The photocurable inkjet printing ink composition proposed by the present invention may contain a coloring agent of each hue to obtain a photocurable inkjet printing ink composition of each color. For such coloring agent, any pigment or dye traditionally used in normal photocurable inkjet printing ink compositions may be used without limitation; from the viewpoint of lightfastness, however, an organic pigment, inorganic pigment, or other pigment is preferred.

Organic pigments include, for example, dye lake pigments, and azo-based, benzimidazolone-based, phthalocyanine-based, quinacridone-based, anthraquinone-based, dioxazine-based, indigo-based, thioindigo-based, perylene-based, perynone-based, diketopyrrolopyrrole-based, isoindolinone-based, nitro-based, nitroso-based, anthraquinone-based, flavanthrone-based, quinophthalone-based, pyranthrone-based, and indanthrone-based pigments, and the like.

Inorganic pigments include, for example, titanium oxide, red iron oxide, antimony red, cadmium yellow, cobalt blue, ultramarine blue, Prussian blue, iron black, chromium oxide green, carbon black, graphite, and other colored pigments (including coloring pigments of white, black and other achromatic colors), as well as calcium carbonate, kaolin, clay, barium sulfate, aluminum hydroxide, talc, and other extender pigments.

In addition, specific examples of pigments for the photocurable inkjet printing ink composition proposed by the present invention are listed below by representative hue. First, yellow pigments for making the present invention usable as a photocurable inkjet printing yellow ink composition include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., among which C. I. Pigment Yellow 150, 155, 180, 213, etc., are preferred. Magenta pigments for making the present invention usable as a photocurable inkjet printing magenta ink composition include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., among which C. I. Pigment Red 122, 202, Pigment Violet 19, etc., are preferred. Cyan pigments for making the present invention usable as a photocurable inkjet printing cyan ink composition include, for example, C. I. Pigment Blue 1, 2, 3, 15, 15:1, 15:2, 15:3, 15:4, 15:6, 16, 18, 22, 27, 29, 60, etc., among which C. I. Pigment Blue 15:4, etc., are preferred. Black pigments for making the present invention usable as a photocurable inkjet printing black ink composition include, for example, carbon black (C. I. Pigment Black 7), etc. White pigments for making the present invention usable as a photocurable inkjet printing white ink composition include, for example, titanium oxide, aluminum oxide, etc., among which titanium oxide of which surface has been treated with alumina, silica, or any of various other materials is preferred. Preferably the pigment content in the photocurable inkjet printing ink composition proposed by the present invention is 1 to 20 percent by mass relative to the total quantity of the photocurable inkjet printing ink composition. If the pigment content is less than 1 percent by mass, the image quality of the obtained printed matter tends to drop. If the content exceeds 20 percent by mass, on the other hand, viscosity characteristics of the photocurable inkjet printing ink composition tends to be negatively affected.

Any of these organic pigments and inorganic pigments may be used on its own, or two or more types may be combined.

(Dispersant)

The photocurable inkjet printing ink composition proposed by the present invention may contain a pigment dispersant as necessary. A pigment dispersant is used to improve the pigment dispersibility and the storage stability of the photocurable inkjet printing ink composition proposed by the present invention, and although any of traditionally used pigment dispersants may be used without any specific limitation; among these, use of a polymer dispersant is preferred.

Such pigment dispersant may be a carbodiimide dispersant, polyester amine dispersant, aliphatic amine dispersant, modified polyacrylate dispersant, modified polyurethane dispersant, multichain polymer nonionic dispersant, polymer ionic activator, etc. Any of these pigment dispersants may be used alone or two or more types may be mixed. Preferably the pigment dispersant is contained by 1 to 200 percent by mass when the quantity of all pigments used represents 100 percent by mass. If the content of the pigment dispersant is less than 1 percent by mass, pigment dispersibility and storage stability of the ink composition proposed by the present invention may drop. On the other hand, while the pigment dispersant can be contained by more than 200 percent by mass, doing so may not result in a difference in effects. The lower limit and the upper limit of the content of the pigment dispersant is more preferably 5 percent by mass and 60 percent by mass, respectively.

(Surface Active Agent)

Preferably the photocurable inkjet printing ink composition proposed by the present invention contains a surface-active agent, preferably a silicon surface-active agent or other surface-active agent traditionally used in photocurable inkjet printing ink compositions, according to the inkjet head used, in order to improve discharge stability. Specific examples of silicon surface-active agents include polyether modified silicone oil, polyester modified polydimethyl siloxane, and polyester modified methyl alkyl polysiloxane, and the like. Any of these may be used alone or two or more types may be combined. The content of the surface-active agent in the photocurable inkjet printing ink composition proposed by the present invention is 0.005 to 1.0 percent by mass. If the content is less than 0.005 percent by mass, the surface tension of the photocurable inkjet printing ink composition proposed by the present invention increases, and discharge stability from the inkjet head drops. If the content exceeds 1.0 percent by mass, on the other hand, more foam generates in the photocurable inkjet printing ink composition and discharge stability drops as a result.

(Additives)

Various additives may be added to the photocurable inkjet printing ink composition proposed by the present invention to express various functionalities as necessary. Specific examples include photostabilizer, surface treatment agent, antioxidant, antiaging agent, crosslinking promoter, polymerization inhibitor, plasticizer, preservative, pH adjuster, defoaming agent, and moisturizing agent, and the like.
(Viscosity)

Preferably the viscosity of the photocurable inkjet printing ink composition proposed by the present invention is 5.0 to 30 mPa·s at 25° C. Viscosity can also be designed to fit each inkjet printing device.

It should be noted that, in this Specification, viscosity represents a viscosity measured with a type-E viscometer (product name: RE100L Viscometer, manufactured by Toki Sangyo) under the conditions of 25° C. and 50 rpm.
(Method for Preparing Ink Composition)

The method for preparing the photocurable inkjet printing ink composition proposed by the present invention is not limited in any way, and it may be prepared by adding all of the aforementioned materials together and mixing them using a bead mill, triple roll mill, etc. It should be noted that, if a pigment is used, the photocurable inkjet printing ink composition proposed by the present invention may also be prepared by mixing together the pigment and the aforementioned pigment dispersant and photopolymerizable compound to obtain a conc, base ink beforehand, and then adding the remainder of the aforementioned components to the mixture to achieve a desired composition.
(Manufacturing of Printed Matter)

Next, a printing method in which the photocurable inkjet printing ink composition proposed by the present invention is used, is explained.

The base material to be printed on using the photocurable inkjet printing ink composition proposed by the present invention is not limited in any way, so long as traditional, known UV-curable inkjet printing ink compositions can be applied on it (such as plastic base material, paper, capsule, gel, metal foil, glass, wood, or fabric). In particular, preferably the base material is constituted by at least one type of substance selected from the group that includes polycarbonate, hard vinyl chloride, soft vinyl chloride, polyethylene, polyester, polypropylene, and polystyrene.

Next, the method for curing the ink composition proposed by the present invention may specifically be one in which the ink composition proposed by the present invention is discharged onto the base material, after which the ink composition attached to the base material is exposed to light and thereby cured.

To be specific, for example, this discharge onto the base material (printing of image) may be achieved by feeding the ink composition proposed by the present invention to the printer head of the inkjet type recording printer device and then discharging the ink composition from the printer head onto the recording material so as to form a coating film of 1 to 20 μm in thickness. The exposure to light and curing (curing of image) may be achieved by irradiating light onto the ink composition that has been applied on the recording material as image.

For the inkjet type recording printer device with which to print the ink composition proposed by the present invention, any traditionally used inkjet type recording printer device may be used. It should be noted that, if a continuous-type inkjet type recording printer device is used, preferably a conductivity adding agent is further added to the ink composition to adjust the conductivity level.

Also, the light source used when curing the image may be ultraviolet light, electron beam, visible light, light-emitting diode (LED), etc.
(Manufacturing of Formed Product)

The printed matter obtained by the aforementioned method may be used, in a favorable manner, in applications where the printed matter is subsequently stretched, bent, stamped, cut, or subject to various other types of machining. Methods to implement the aforementioned stretching, bending, stamping, and other machining include stretching using a commonly used stretching device, pressing or cutting using dies of specified shapes under heat or not under heat, and various other general methods.

In addition, the synergistic effects of the inkjet printing method that provides a simple way to achieve decorative printing on one hand, and the performance characteristics of the cured film of the ink composition proposed by the present invention of which photocurability achieves excellent adhesion onto a base material, stretchability, heat resistance, abrasion resistance, and applicability to various types of processing on the other, allow printed matter to be obtained in a simple, clean manner, and furthermore the obtained printed matter can be stretched or bent in a favorable manner, even under a range of tougher conditions from low-temperature conditions that help save thermal energy to high-temperature conditions where thermoforming can be performed with ease. As described above, a formed product obtained by printing the photocurable inkjet printing ink composition proposed by the present invention onto a base material according to the inkjet printing method to form a coating film, curing the coating film by means of photopolymerization, and then thermoforming or otherwise mechanically forming the obtained printed matter, is also included in the scope of the present invention.

EXAMPLES

The present invention is explained in greater detail by citing examples below; it should be noted, however, that the present invention is not limited to these examples. It should also be noted that, unless otherwise specified, "%" refers to "percent by mass," while "part" refers to "part by mass."

The materials used in the Examples and Comparative Examples below are as follows.
<Pigment Dispersants>
Ajisper (registered trademark) PB821 (manufactured by Ajinomoto Fine-Techno)
Solsperse 56000 (manufactured by Lubrizol Japan)
<Photopolymerizable Components>
Acryloyl morpholine (manufactured by Kohjin Film & Chemicals)
Isobornyl acrylate (manufactured by Osaka Organic Chemical Industry)
2-phenoxy ethyl acrylate (manufactured by Sartomer)
Benzyl acrylate (manufactured by Osaka Organic Chemical Industry)
N-vinyl caprolactam (manufactured by ISP (Japan) Ltd.)
Dipropylene glycol diacrylate (manufactured by Sartomer)
PEG400: Polyethylene glycol (400) diacrylate (manufactured by Sartomer)
1,6-hexane diol acrylate (manufactured by Sartomer)
Trimethylol propane triacrylate (manufactured by Sartomer)
Acrylated amine compound: CN371 (acrylated amine compound having two photopolymerizable functional groups and two amino groups in the molecule; manufactured by Sartomer)
<Photopolymerization Initiators>
TPO: 2,4,6-trimethyl benzoyl diphenyl phosphine oxide (manufactured by Lamberti)
DETX: 2,4-diethyl thioxanthone (manufactured by Lambson)

<Additive>
BYK-315 (silicone additive, manufactured by BYK Chemie)

Examples 1 to 9 and Comparative Examples 1 to 5

Preparation of Photocurable Inkjet Printing Ink Composition
(Black Ink Compositions)

A mixture prepared by blending together a pigment (Pigment Black 7), a pigment dispersant (Ajisper PB821, manufactured by Ajinomoto Fine-Techno) and a photopolymerizable compound (benzyl acrylate), at blending ratios (percent by mass) of 20/8/72, was dispersed in an Eiger mill (using zirconium beads of 0.5 mm in diameter as media), to obtain a conc. base. The obtained conc. base was blended and mixed under agitation with the respective components to achieve each of the blending compositions (percent by mass) in Table 1, to obtain the photocurable inkjet printing blank ink compositions in Examples 1 to 5 and Comparative Examples 1 to 5.

(Yellow Ink Composition)

A mixture prepared by blending together a pigment (Pigment Yellow 150), a pigment dispersant (Solsperse 56000, manufactured by Lubrizol Japan) and a photopolymerizable compound (benzyl acrylate), at blending ratios (percent by mass) of 16/6.4/77.6, was dispersed in an Eiger mill (using zirconium beads of 0.5 mm in diameter as media), to obtain a conc. base. The obtained conc. base was blended and mixed under agitation with the respective components to achieve the blending composition (percent by mass) in Table 1, to obtain the photocurable inkjet printing yellow ink composition in Example 6.

(Cyan Ink Composition)

A mixture prepared by blending together a pigment (Pigment Blue 15:4), a pigment dispersant (Solsperse 56000, manufactured by Lubrizol Japan) and a photopolymerizable compound (benzyl acrylate), at blending ratios (percent by mass) of 20/8/72, was dispersed in an Eiger mill (using zirconium beads of 0.5 mm in diameter as media), to obtain a conc. base. The obtained conce. base was blended and mixed under agitation with the respective components to achieve the blending composition (percent by mass) in Table 1, to obtain the photocurable inkjet printing cyan ink composition in Example 7.

(Magenta Ink Composition)

A mixture prepared by blending together a pigment (Pigment Red 122), a pigment dispersant (Solsperse 56000, manufactured by Lubrizol Japan) and a photopolymerizable compound (benzyl acrylate), at blending ratios (percent by mass) of 16/9.4/74.4, was dispersed in an Eiger mill (using zirconium beads of 0.5 mm in diameter as media), to obtain a conc. base. The obtained conc. base was blended and mixed under agitation with the respective components to achieve the blending composition (percent by mass) in Table 1, to obtain the photocurable inkjet printing magenta ink composition in Example 8.

(White Ink Composition)

A mixture prepared by blending together titanium oxide, a pigment dispersant (Ajisper PB821, manufactured by Ajinomoto Fine-Techno) and a photopolymerizable compound (benzyl acrylate), at blending ratios (percent by mass) of 40/4/56, was dispersed in an Eiger mill (using zirconium beads of 0.5 mm in diameter as media), to obtain a conc. base. The obtained conc. base was blended and mixed under agitation with the respective components to achieve the blending composition (percent by mass) in Table 1, to obtain the photocurable inkjet printing white ink composition in Example 9.

[Viscosity Measurement of Ink Compositions]

The photocurable inkjet printing ink compositions obtained in Examples 1 to 9 and Comparative Examples 1 to 5 were measured for viscosity using a type E viscometer (product name: RE100L Viscometer, manufactured by Toki Sangyo) under the conditions of 25° C. in temperature and 50 rpm in rotor speed. The results are shown in Table 1.

[Performance Evaluation of Ink Compositions]

<Normal Film Thickness>

(Curability, Adhesion, Tackiness, Abrasion Resistance, Bending Tolerance, Discharge Stability)

The photocurable inkjet printing ink compositions obtained in Examples 1 to 9 and Comparative Examples 1 to 5 were applied on PVC80 (manufactured by Lintec) using a #4 bar coater. Next, the applied ink compositions were cured using a UV-LED lamp manufactured by Phoseon Technology.

(Bending Tolerance)

The photocurable inkjet printing ink compositions obtained in Examples 1 to 9 and Comparative Examples 1 to 5 were applied on PET (manufactured by Lintec) using a #4 bar coater. Next, the applied ink compositions were cured using a UV-LED lamp manufactured by Phoseon Technology.

Curability, adhesion, tackiness, abrasion resistance, discharge stability, and bending tolerance were evaluated using the methods below. The results are shown in Table 1.

<LED Curability>

Each sample was irradiated with a UV-LED lamp manufactured by Phoseon Technology under the conditions of 2 cm in distance between the lamp and the ink-applied surface and 1 second in irradiation time per irradiation (for a total UV light quantity of 60 mJ/cm$^2$ per second), and LED curability was evaluated based on the total light quantity needed before the ink could no longer be rubbed off using a cotton swab, or the number of irradiations needed before surface tackiness was lost.

(Tackiness)

Each sample was irradiated with a UV-LED lamp manufactured by Phoseon Technology under the conditions of 2 cm in distance between the lamp and the ink-applied surface and 1 second in irradiation time per irradiation (for a total UV light quantity of 60 mJ/cm$^2$ per second), and tackiness was evaluated based on visual confirmation, according to the criteria below, of the condition of coating film surface after touching each cured film after one irradiation.

⊚: There was no tackiness.
○: There was almost no tackiness.
Δ: There was slightly tackiness.
X: There was tackiness.

<Adhesion>

Each ink composition was printed on PVC80 (manufactured by Lintec) and cured until tackiness of the surface was lost, after which cross-cuts were made into the cured film using a cutting knife, a clear adhesive tape was adhered onto the cross-cuts and then peeled off, and the degree of peeling of the cured film was evaluated according to the criteria below:

⊚: The cured film was not peeled.
○: The cured film was almost not peeled.
Δ: The cured film was peeled, but the peeled area was less than 20% of the total area.
X: The peeled area of the cured film was 20% or more of the total area.

<Abrasion Resistance>

Each coating film was rubbed 100 times with a bleached cloth under a load of 500 g using a Gakushin-type color fastness tester (manufactured by Daiei Kagaku Seiki), and the degree to which the coating film was rubbed off was visually observed and evaluated according to the criteria below:

◯: The coating film was not rubbed off.
Δ: The surface of the coating film had scratch marks.
X: The coating film was rubbed off, and the base material became exposed.

<Discharge Stability>

The ink compositions obtained in Examples 1 to 9 and Comparative Examples 1 to 5 were let stand for 24 hours in an ambient temperature of 25° C., together with an inkjet type recording device equipped with an inkjet nozzle for low-viscosity ink, to bring the temperatures of the inkjet type recording device and the ink compositions to 25° C. Thereafter, each ink composition was printed continuously onto PVC80 (manufactured by Lintec) in an ambient temperature of 25° C., and discharge stability was evaluated according to the criteria below:

◯: Printing was not disturbed, and the ink could be discharged stably.
Δ: Printing was slightly disturbed.
X: Printing was disturbed, or the ink could not be discharged stably.

<Bending Tolerance>

Printed matter produced with each ink composition that had been cured until tackiness of the surface was lost, was bent by 180°, and the condition of cracking was visually evaluated.

◉: The printed matter did not crack.
◯: The printed matter almost did not crack.
Δ: The printed matter almost did not crack, but it creased.
X: The printed matter cracked.

TABLE 1

| | | | Examples | | | | | | | |
| --- | --- | --- | --- | --- | --- | --- | --- | --- | --- | --- |
| | | | Black | | | | | Yellow | Cyan |
| Composition | | | 1 | 2 | 3 | 4 | 5 | 6 | 7 |
| Polymerizable compound | Acrylamide-based monomer | Acryloyl morpholine | 8.0 | 15.0 | 25.0 | 48.0 | 35.0 | 25.0 | 22.0 |
| | Monofunctional monomer other than acrylamide-based monomer | Isobornyl acrylate | 15.0 | 20.0 | 5.0 | — | 8.5 | 10.0 | 15.0 |
| | | Phenoxy ethyl acrylate | 18.0 | — | 10.0 | — | — | 15.0 | 8.0 |
| | | Benzyl acrylate | 28.0 | 25.0 | 34.7 | 20.0 | 23.0 | 24.0 | 24.0 |
| | | N-vinyl caprolactam | 5.0 | 10.0 | 6.0 | 10.0 | — | 10.0 | 12.0 |
| | Polymerizable component having two or more functionalities | Dipropylene glycol diacrylate | 10.0 | — | — | — | — | 8.0 | 8.0 |
| | | PEG400 diacrylate | — | — | — | 5.0 | 13.0 | — | — |
| | | 1,6-hexane diol diacrylate | — | 6.0 | — | — | — | — | — |
| | | Trimethylol propane triacrylate | — | — | 5.0 | — | — | — | — |
| | | Acrylated amine compound | — | 2.0 | — | — | 2.0 | — | — |
| | Resin | Acryl resin (MMA/BMA MW30000) | 0.0 | 5.0 | 1.0 | — | 1.5 | 1.0 | 1.2 |
| Coloring agent (pigment) | | Printex 35 | 1.6 | 1.6 | 1.6 | 1.6 | 1.6 | — | — |
| | | G01 | — | — | — | — | — | 2.0 | — |
| | | D7110F | — | — | — | — | — | — | 1.6 |
| | | RGT | — | — | — | — | — | — | — |
| | | CR-50 | — | — | — | — | — | — | — |
| Pigment dispersant | | PB821 | 0.6 | 0.6 | 0.6 | 0.6 | 0.6 | — | — |
| | | Solsperse 56000 | — | — | — | — | — | 0.8 | 0.6 |
| Acylphosphine oxide photopolymerization initiator | | TPO | 9.7 | 10.5 | 7.0 | 10.5 | 10.5 | 7.0 | 6.6 |
| Thioxanthone photopolymerization initiator | | DETX | 3.6 | 3.8 | 3.6 | 3.8 | 3.8 | 2.0 | 0.5 |
| Surface active agent | | BYK315 | 0.5 | 0.5 | 0.5 | 0.5 | 0.5 | 0.5 | 0.5 |
| Total ink composition (parts by mass) | | | 100.0 | 100.0 | 100.0 | 100.0 | 100.0 | 105.3 | 100.0 |
| Percentage of acrylamide-based monomer in polymerizable compound (percent by mass) | | | 8.0 | 15.0 | 25.0 | 48.0 | 35.0 | 25.0 | 22.0 |
| Percentage of monofunctional monomer other than acrylamide-based monomer in polymerizable compound (percent by mass) | | | 66.0 | 55.0 | 55.7 | 30.0 | 31.5 | 59.0 | 59.0 |
| Total percentage of aforementioned monomers (percent by mass) | | | 74.0 | 70.0 | 59.5 | 78.0 | 71.1 | 72.1 | 73.1 |
| Total acrylate having two or more functionalities | | | 10.0 | 8.0 | 5.0 | 5.0 | 15.0 | 8.0 | 8.0 |
| Content of acylphosphine oxide photopolymerization initiator relative to 100 parts by mass of polymerizable compound (parts by mass) | | | 11.5 | 13.8 | 8.2 | 12.7 | 13.2 | 7.6 | 7.4 |
| Content of thioxanthone photopolymerization initiator relative to 100 parts by mass of polymerizable compound (parts by mass) | | | 4.3 | 5.0 | 4.2 | 4.6 | 4.8 | 2.2 | 0.6 |
| Content of thioxanthone photopolymerization initiator relative to 100 parts by mass of pigment (parts by mass) | | | 225.0 | 237.5 | 225.0 | 237.5 | 237.5 | 100.0 | 31.3 |
| (1) Viscosity of ink composition (mPa·s, 25° C.) | | | 5.8 | 10.2 | 8.2 | 10.5 | 23.1 | 14.3 | 14.8 |
| (2) Discharge stability of ink composition | | | ◯ | ◯ | ◯ | ◯ | ◯ | ◯ | ◯ |
| (3) Curability of ink composition (number of 60 mJ/cm$^2$ irradiations) | | | 2 | 1 | 1 | 1 | 1 | 1 | 1 |
| (4) Tackiness of ink composition (60 mJ/cm$^2$) after 1 irradiation pass | | | ◯ | ◉ | ◉ | ◉ | ◉ | ◉ | ◉ |

TABLE 1-continued

| | | | Examples | | Comparative Examples | | | | |
|---|---|---|---|---|---|---|---|---|---|
| | | | Magenta | White | Black | | | | |
| | Composition | | 8 | 9 | 1 | 2 | 3 | 4 | 5 |
| | (5) Adhesion of cured film (PET base material) | | ◎ | ○ | ◎ | ○ | ○ | ○ | ○ |
| | (6) Bending tolerance of cured film | | ◎ | ○ | ○ | ○ | ◎ | ◎ | ◎ |
| | (7) Abrasion resistance of cured film | | ○ | ○ | ○ | ◎ | ○ | ○ | ○ |
| Polymerizable compound | Acrylamide-based monomer | Acryloyl morpholine | 23.8 | 24.0 | 1.2 | 8.0 | 5.0 | 45.0 | 65.0 |
| | Monofunctional monomer other than acrylamide-based monomer | Isobornyl acrylate | 12.0 | 10.0 | 30.0 | 15.0 | 20.0 | — | 10.0 |
| | | Phenoxy ethyl acrylate | 6.0 | 6.0 | 10.0 | 10.0 | 30.0 | — | — |
| | | Benzyl acrylate | 24.0 | 26.0 | 26.8 | 11.2 | 22.6 | 14.0 | 8.0 |
| | | N-vinyl caprolactam | 14.0 | 2.0 | 5.0 | 9.5 | 2.0 | — | — |
| | Polymerizable component having two or more functionalities | Dipropylene glycol diacrylate | 8.0 | 8.0 | 10.0 | — | — | 14.0 | — |
| | | PEG400 diacrylate | — | — | — | — | 3.8 | — | — |
| | | 1,6-hexane diol diacrylate | — | — | — | 31.0 | — | — | 2.0 |
| | | Trimethylol propane triacrylate | — | — | — | — | — | — | — |
| | | Acrylated amine compound | — | — | — | — | — | — | 2.0 |
| | Resin | Acryl resin (MMA/BMA MW30000) | 0.8 | 2.0 | 1.0 | 0.8 | 1.4 | 10.0 | 0.5 |
| | Coloring agent (pigment) | Printex 35 | — | — | 1.6 | 1.6 | 1.6 | 1.6 | 1.6 |
| | | G01 | — | — | — | — | — | — | — |
| | | D7110F | — | — | — | — | — | — | — |
| | | RGT | 2.4 | — | — | — | — | — | — |
| | | CR-50 | — | 12.8 | — | — | — | — | — |
| | Pigment dispersant | PB821 | — | 0.6 | 0.6 | 0.6 | 0.6 | 0.6 | 0.6 |
| | | Solsperse 56000 | 1.0 | — | — | — | — | — | — |
| Acylphosphine oxide photopolymerization initiator | | TPO | 7.0 | 8.1 | 9.7 | 8.0 | 8.5 | 10.5 | 6.8 |
| Thioxanthone photopolymerization initiator | | DETX | 0.5 | — | 3.6 | 3.8 | 4.0 | 3.8 | 3.0 |
| Surface active agent | | BYK315 | 0.5 | 0.5 | 0.5 | 0.5 | 0.5 | 0.5 | 0.5 |
| | Total ink composition (parts by mass) | | 100.0 | 100.0 | 100.0 | 100.0 | 100.0 | 100.0 | 100.0 |
| | Percentage of acrylamide-based monomer in polymerizable compound (percent by mass) | | 23.8 | 24.0 | 1.2 | 8.0 | 5.0 | 45.0 | 65.0 |
| | Percentage of monofunctional monomer other than acrylamide in polymerizable compound (percent by mass) | | 56.0 | 44.0 | 71.8 | 45.7 | 74.6 | 14.0 | 18.0 |
| | Total percentage of aforementioned monomers (percent by mass) | | 74.1 | 68.0 | 73.0 | 53.7 | 59.5 | 59.0 | 83.0 |
| | Total acrylate having two or more functionalities | | 8.0 | 8.0 | 10.0 | 31.0 | 3.8 | 14.0 | 4.0 |
| | Content of acylphosphine oxide photopolymerization initiator relative to 100 parts by mass of polymerizable compound (parts by mass) | | 8.0 | 10.7 | 11.7 | 9.4 | 10.2 | 14.4 | 7.8 |
| | Content of thioxanthone photopolymerization initiator relative to 100 parts by mass of polymerizable compound (parts by mass) | | 0.6 | 0.0 | 4.3 | 4.5 | 4.8 | 5.2 | 0.0 |
| | Content of thioxanthone photopolymerization initiator relative to 100 parts by mass of pigment (parts by mass) | | 20.8 | 0.0 | 225.0 | 237.5 | 250.0 | 237.5 | 0.0 |
| | (1) Viscosity of ink composition (mPa · s, 25° C.) | | 12.2 | 16.2 | 6.8 | 8.2 | 7.8 | 22.4 | 13.8 |
| | (2) Discharge stability of ink composition | | ○ | ○ | ○ | ○ | ○ | Δ | ○ |
| | (3) Curability of ink composition (number of 60 mJ/cm² irradiations) | | 1 | 1 | 3 | 3 | 3 | 2 | 1 |
| | (4) Tackiness of ink composition (60 mJ/cm²) after 1 irradiation pass | | ◎ | ◎ | Δ | ◎ | Δ | ◎ | ◎ |
| | (5) Adhesion of cured film (PET base material) | | ○ | ○ | ◎ | X | ◎ | Δ | ○ |
| | (6) Bending tolerance of cured film | | ◎ | ◎ | ◎ | X | ○ | Δ | Δ |
| | (7) Abrasion resistance of cured film | | ○ | ○ | ○ | ○ | Δ | ○ | ○ |

Based on the results shown in the table above, printed layers offering not only excellent ink discharge stability, but also excellent curability under ultraviolet irradiation as well as excellent adhesion to the base material and bending tolerance and abrasion resistance of the cured film, could be formed by using the photocurable inkjet printing ink compositions according to the present invention. This means that, when a resin film on which the ink is printed is stretched, bent or otherwise post-processed, for example, the printed layer will have excellent appearance and abrasion resistance after the post-processing.

On the other hand, all of these properties are not achieved simultaneously in any of the Comparative Examples that did not meet the requirements of the present invention, where Comparative Example 1 representing a lower content of acrylamide-based monomer led to insufficient curability and some tackiness. Comparative Example 2 representing a lower percentage of monofunctional monomer and a higher percentage of acrylate having two or more functionalities resulted in poor curability as well as poor adhesion and bending tolerance of the cured film. Comparative Example 3 representing a higher content of monofunctional monomer other than acrylamide-based monomer and a lower content of acrylate having two or more functionalities resulted in poor curability and abrasion resistance, with the cured film exhibiting tackiness. Comparative Example 4 representing a lower content of monofunctional monomer other than acrylamide-based monomer resulted in poor discharge stability as well as poor adhesion and bending tolerance of the cured film. Furthermore, Comparative Example 5 representing a higher content of acrylamide-based monomer and a lower content of acrylate having two or more functionalities resulted in poor bending tolerance of the cured film.

What is claimed is:
1. A photocurable inkjet printing ink composition containing a photopolymerizable compound and a photopoly- merization initiator, wherein in 100 percent by mass of the photocurable inkjet printing ink composition, included are:

a. an acrylamide-based monomer by 22.0 to 50 percent by mass, which is expressed by General Formula (I) below:

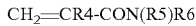
CH$_2$=CR4-CON(R5)R6 wherein R4 represents a hydrogen atom or a methyl group; R5 and R6 may be the same or different, and although they are each a hydrogen atom or a substituted or an unsubstituted alkyl group with the carbon number from 1 to 8, they are not a hydrogen atom at the same time; and alternatively, R5 and R6 may be bonded to form a ring together with an adjacent nitrogen atom;

b. a monofunctional monomer other than acrylamide-based monomer by 15 to 70 percent by mass;

c. a polymerizable compound having two or more functionalities by 5.0 to 20.0 percent by mass;

d. an acrylated amine compound having two photopolymerizable functional groups and two amino groups in the molecule by more than 0 percent by mass but no more than 10 percent by mass; and e. the percentage of monofunctional monomers in the photopolymerizable compound is 60 to 99.5 percent by mass.

2. The photocurable inkjet printing ink composition according to claim 1, wherein the acrylamide-based monomer is an acryloyl morpholine.

3. The photocurable inkjet printing ink composition according to claim 1, wherein the photopolymerization initiator contains an acylphosphine oxide photopolymerization initiator and the acylphosphine oxide photopolymerization initiator accounts for 2 to 15 percent by mass relative to 100 percent by mass of the photopolymerizable compound.

4. The photocurable inkjet printing ink composition according to claim 1, wherein the photopolymerization initiator contains a thioxanthone photopolymerization initiator and the thioxanthone photopolymerization initiator accounts for 5 percent by mass or less relative to 100 percent by mass of the photopolymerizable compound.

5. The photocurable inkjet printing ink composition according to claim 1, which contains a coloring agent.

6. The photocurable inkjet printing ink composition according to claim 1, of which viscosity at 25° C. is 5.0 to 30 m·Pas.

7. The photocurable inkjet printing ink composition according to claim 2, wherein the photopolymerization initiator contains an acylphosphine oxide photopolymerization initiator and the acylphosphine oxide photopolymerization initiator accounts for 2 to 15 percent by mass relative to 100 percent by mass of the photopolymerizable compound.

8. The photocurable inkjet printing ink composition according to claim 2, wherein the photopolymerization initiator contains a thioxanthone photopolymerization initiator and the thioxanthone photopolymerization initiator accounts for 5 percent by mass or less relative to 100 percent by mass of the photopolymerizable compound.

9. The photocurable inkjet printing ink composition according to claim 2, which contains a coloring agent.

10. The photocurable inkjet printing ink composition according to claim 2, of which viscosity at 25° C. is 5.0 to 30 mPa·s.

11. The photocurable inkjet printing ink composition according to claim 3, wherein the photopolymerization initiator contains a thioxanthone photopolymerization initiator and the thioxanthone photopolymerization initiator accounts for 5 percent by mass or less relative to 100 percent by mass of the photopolymerizable compound.

12. The photocurable inkjet printing ink composition according to claim 3, which contains a coloring agent.

13. The photocurable inkjet printing ink composition according to claim 3, of which viscosity at 25° C. is 5.0 to 30 mPa·s.

14. The photocurable inkjet printing ink composition according to claim 4, which contains a coloring agent.

* * * * *